H. J. HORSTMANN.
AIR COMPRESSOR.
APPLICATION FILED DEC. 14, 1907.

901,344.

Patented Oct. 20, 1908.

WITNESSES:

INVENTOR
Henry J. Horstmann,
BY
Fraentzel and Richards
ATTORNEYS

H. J. HORSTMANN.
AIR COMPRESSOR.
APPLICATION FILED DEC. 14, 1907.

901,344.

Patented Oct. 20, 1908.

WITNESSES:

INVENTOR:
Henry J. Horstmann,
BY
Fraentzel and Richards,
ATTORNEYS

H. J. HORSTMANN.
AIR COMPRESSOR.
APPLICATION FILED DEC. 14, 1907.

901,344.

Patented Oct. 20, 1908.
7 SHEETS—SHEET 5.

WITNESSES:

INVENTOR
Henry J. Horstmann,
BY
Fraentzel and Richards
ATTORNEYS

H. J. HORSTMANN.
AIR COMPRESSOR.
APPLICATION FILED DEC. 14, 1907.

901,344.

Patented Oct. 20, 1908.

WITNESSES:
F. H. W. Fraentzel
Anna H. Alter

INVENTOR:
Henry J. Horstmann,
BY
Fraentzel and Richards,
ATTORNEYS

UNITED STATES PATENT OFFICE.

HENRY J. HORSTMANN, OF FORT WAYNE, INDIANA.

AIR-COMPRESSOR.

No. 901,344.     Specification of Letters Patent.     Patented Oct. 20, 1908.

Application filed December 14, 1907. Serial No. 406,468.

*To all whom it may concern:*

Be it known that I, HENRY J. HORSTMANN, a citizen of the United States, residing at Fort Wayne, in the county of Allen and State of Indiana, have invented certain new and useful Improvements in Air-Compressors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in air-compressors; and, the invention relates, more particularly, to a novel construction of air-compressor which may also be used as an exhauster, and which involves the use of the principle of centrifugal force in the operation of compressing or exhausting air, and whereby an apparatus or engine of high efficiency is the result which can be operated at a very low or minimum power expenditure.

The present invention has for its principal object to provide a novel construction of air-compressor or exhauster having few parts, and these of simple construction, thus providing a very simple but efficient compressor exhauster of the character hereinafter more particularly set forth; and, furthermore, to provide an air-compressor comprising a plurality of cylinders, each of said plurality of cylinders mounted and operated, in such a manner so that each cylinder will be caused to revolve about an axis extending laterally across the cylinder and midway between its ends; and, furthermore, the axis of each of said cylinders being caused to revolve about a common and centrally fixed point. In this manner, I have produced an air-compressor or exhauster in which each cylinder revolves about its axis, and the axis of each cylinder in turn, revolves about a centrally fixed point, thereby producing sufficient centrifugal force which operates to cause the pistons, slidably arranged in the several cylinders, to slide back and forth from end to end of the cylinder, to compress the air in said cylinders, and finally driving the same to a common outlet with which the compressor is provided, and from which the air can be conducted to a storage tank or reservoir, or otherwise utilized. Furthermore, by means of the momentum which the revolving cylinders gain in their operation, as above described, a minimum expenditure of power is required to keep the compressor or exhauster in operation, and at the same time, a very high efficiency in compressing air is produced.

Other objects of this invention not at this time more particularly mentioned, will be clearly understood from the following detailed description of the same.

With the various objects of my present invention in view, the said invention consists, primarily, in the novel air-compressor or exhauster hereinafter set forth; and, furthermore, this invention consists in the various arrangements and combinations of devices and parts, as well as in the details of the constructions of the same, all of which will be more fully described in the following specification, and then finally embodied in the clauses of the claims which are appended to and which form an essential part of this specification.

The invention is clearly illustrated in the accompanying drawings, in which:—

Similar characters of reference are employed in all of the above described views, to indicate corresponding parts.

Figure 1:
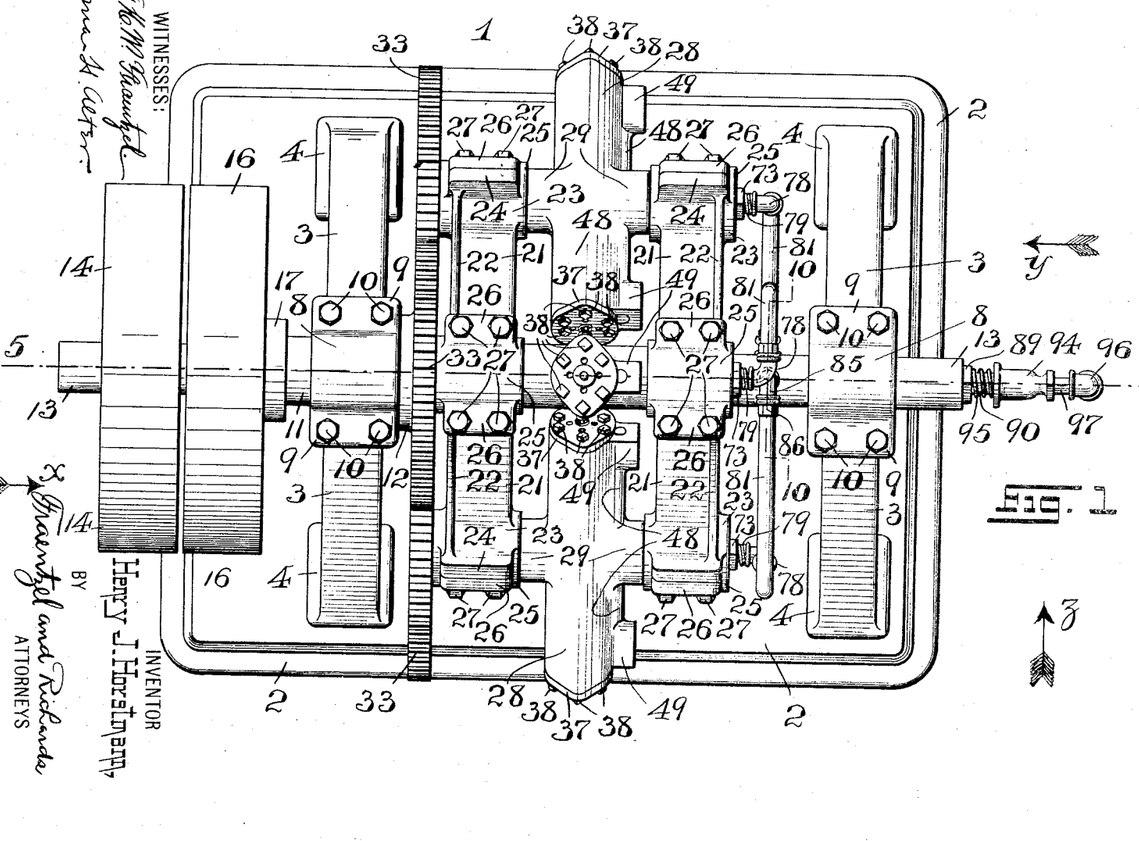
Figure 1 is a plan view of one form of air-compressor or exhauster embodying the principles of the present invention.
Figure 2:
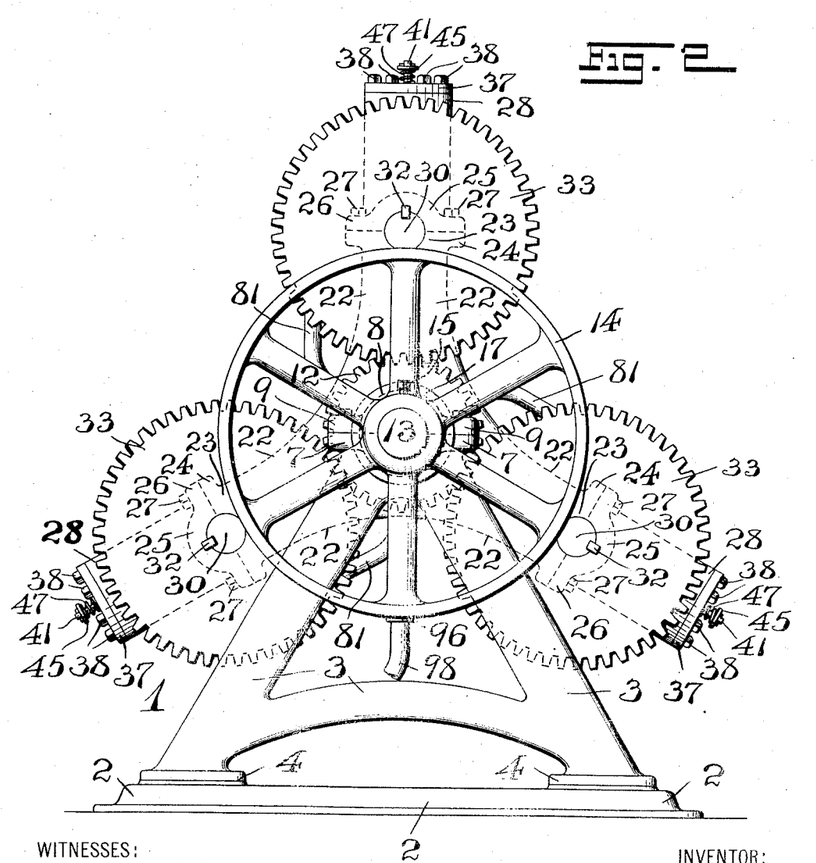
Fig. 2 is an end elevation of the same, looking in the direction of the arrow $x$.
Figure 3:
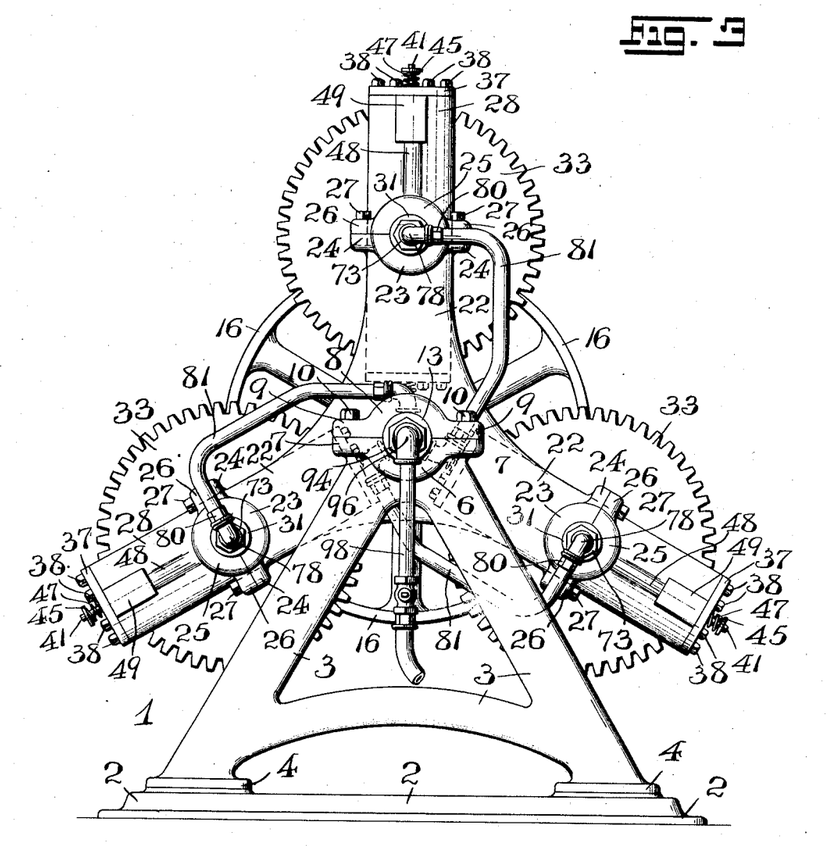
Fig. 3 is an end elevation of the compressor, looking in the direction of the arrow $y$.
Figure 4:
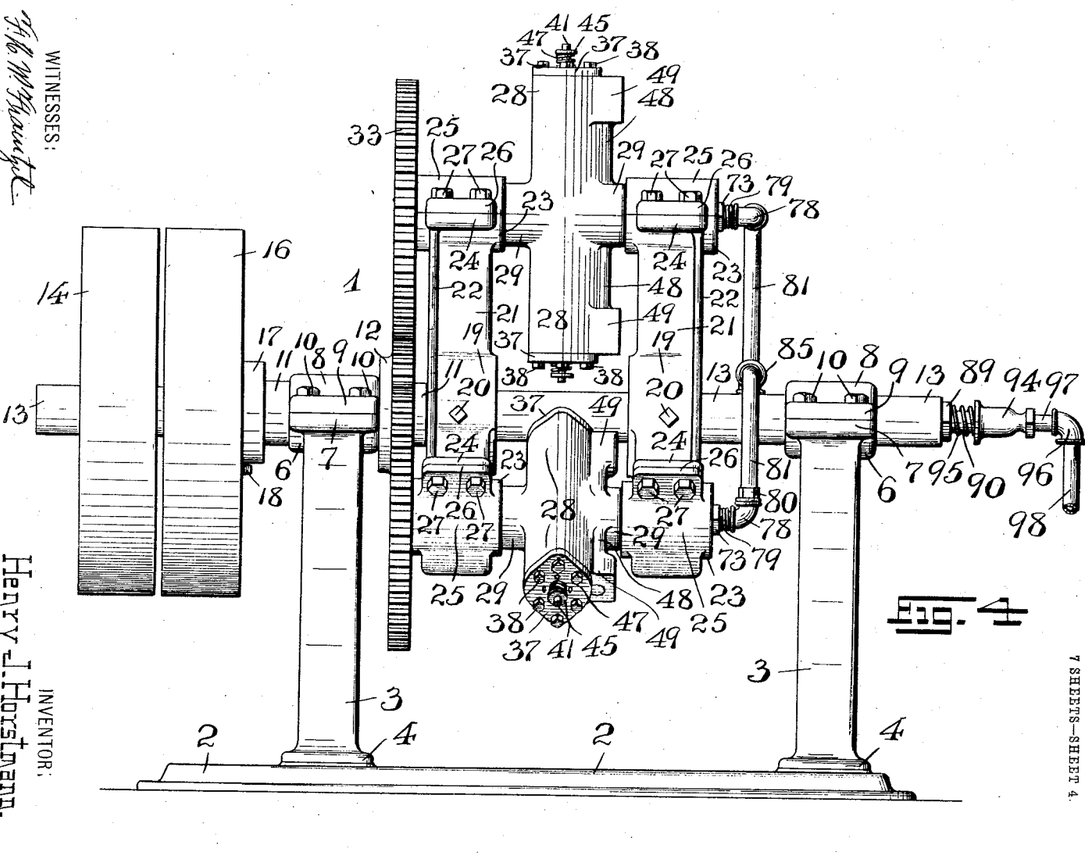
Fig. 4 is a side-elevation of the device or apparatus.
Figure 5:
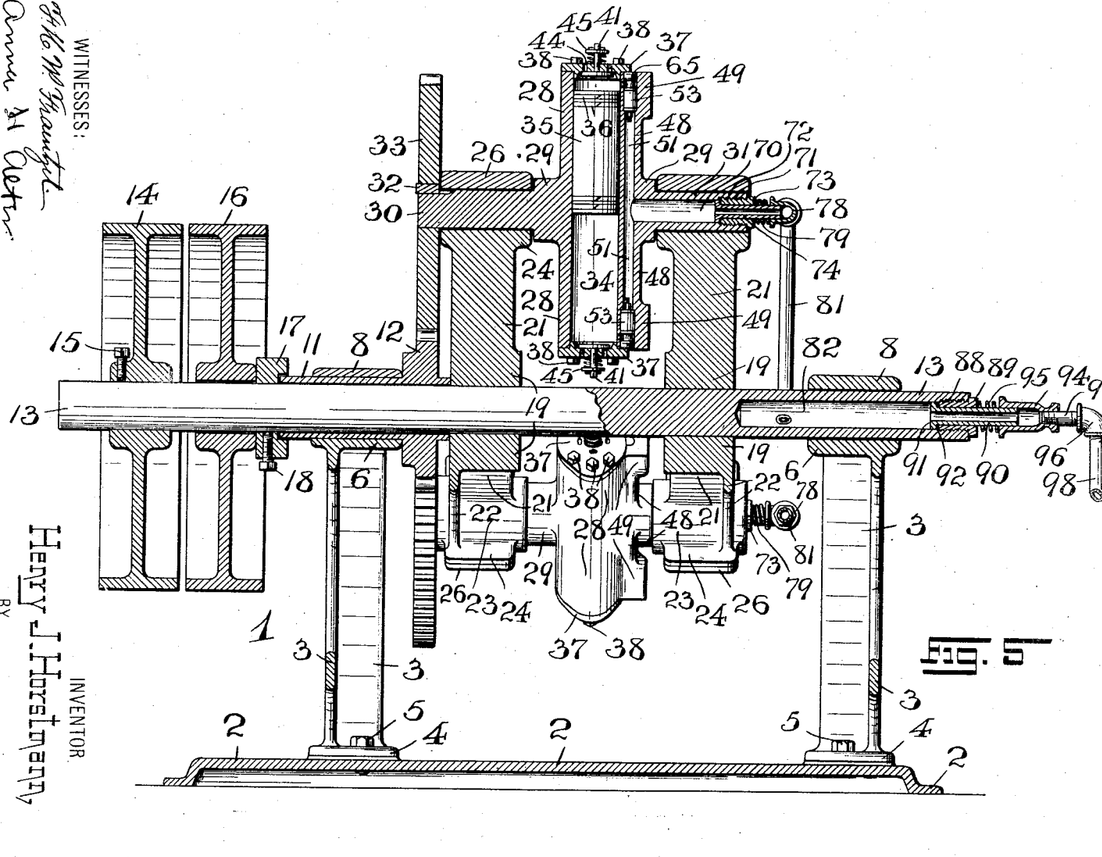
Fig. 5 is a vertical longitudinal section of the same, said section being taken on line 5—5 in said Fig. 1, and looking in the direction of the arrow $z$.
Figures 6, 7, 8:
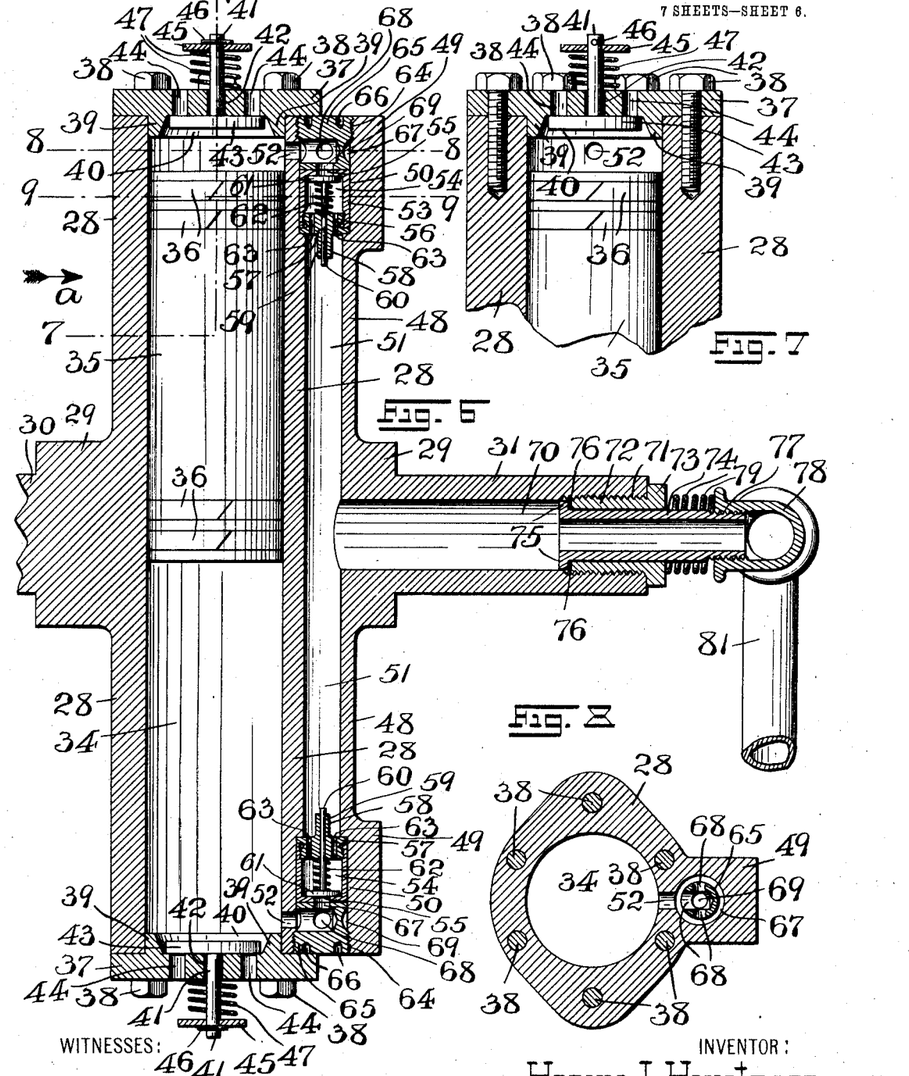
Fig. 6 is a vertical longitudinal section of one of the cylinders of the air compressor or exhauster illustrated on an enlarged scale.
Fig. 7 is a detail vertical section of a portion of one of the ends of said cylinder, said section being taken on line 7—7 in said Fig. 6, and looking in the direction of the arrow $a$.
Fig. 8 is a detail horizontal section of one end of said cylinder, said section being taken on line 8—8 in said Fig. 6.
Figure 9:
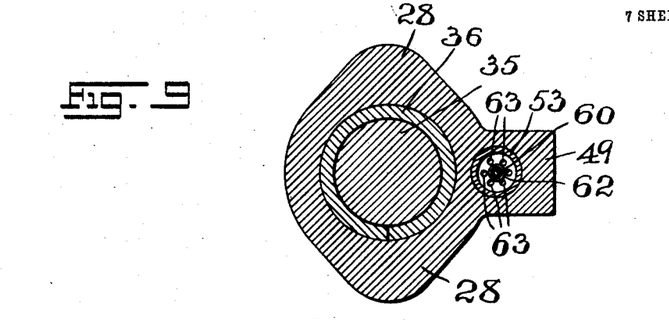
Fig. 9 is another detail cross-section of the same, taken on line 9—9 in said Fig. 6.
Figure 10:
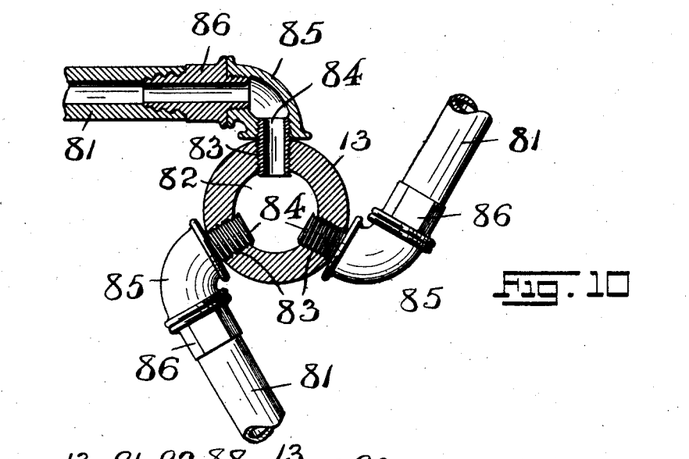
Fig. 10 is a detail cross-section of a portion of the main shaft, taken on line 10—10 in said Fig. 1, and illustrating the connection of the air-conduits or pipes therewith.
Figure 11:
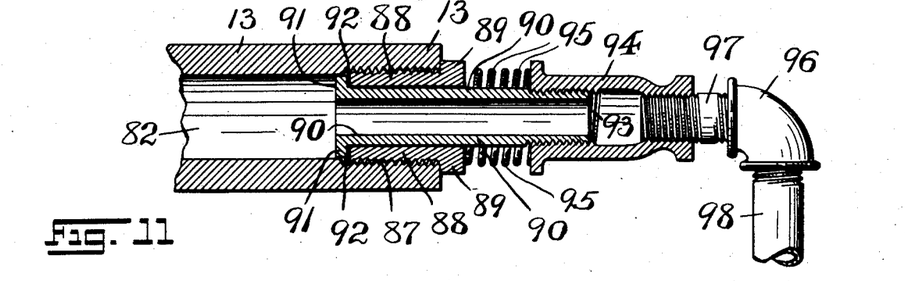
Fig. 11 is a longitudinal vertical section of the outlet end of said main shaft, said section being made on an enlarged scale.

Referring now to the several figures of the drawings, the reference-character 1 indicates a complete air-compressor or exhauster embodying the principles of the present invention, the same comprising a suitable base or foundation 2, preferably of cast metal, upon which are mounted suitable supports or standards 3, the feet 4 of which are secured to the said base or foundation member by means of bolts or screws 5. The said standards 3 are provided with suitable journal-boxes or bearings 6 which are provided with oppositely and outwardly extending flanges 7. Said journal-boxes or bearings 6 are further provided with journal-box caps 8 also formed with oppositely and outwardly extending flanges 9, which correspond to and rest upon the flanges 7 of the journal-boxes 6, and are secured in place thereon by means of bolts 10 which are tapped into said flanges 7 and 9, in the usual and well-known manner.

Rigidly secured in one of said journal-boxes 6 is a hollow hub-member 11 of a gear-wheel 12, clamped in the said journal box 6 by means of the journal-box-cap 8 and the bolts 10 in such a manner, so that the said gear-wheel 12 is held stationary with relation to the standard 3 and is prevented from turning. A main shaft 13 passes through the hollow hub member 11 of the stationary gear 12, being journaled therein, and another portion of the said main-shaft 13 being journaled in the remaining journal-box or bearing 6 of the opposite standard 3, as will be clearly evident from an inspection of the drawings. Mounted upon one end of the said main shaft 13 is a driving pulley 14, secured thereto by means of the set-screw 15, or fixed thereon in any other suitable manner, and adjacent to said driving-pulley, is a loose pulley 16 which is retained in its proper place upon the main shaft 13 by means of a collar 17, fixed to said shaft by means of the set-screw 18, or in any other suitable manner.

Rigidly secured in a proper position upon said main-shaft 13, between the said pair of standards 3, and adapted to turn or revolve with said main-shaft are a pair of spiders, each comprising a hub-member 19, secured to said main-shaft 13 by means of a set-screw 20, or in any other suitable manner. Said hub-members are provided with a plurality of radial arms 21, said radial-arms 21 being further provided with strengthening ribs 22. Each of said radial-arms is also provided upon its outer or free-end with a suitable journal-box or bearing 23, preferably forming an integral part of said radial-arm 21, each journal-box or bearing 23 being provided with oppositely and outwardly extending flanges 24. The said journal-boxes or bearings 23 are further provided with journal-box caps 25, also formed with oppositely and outwardly extending flanges 26, which correspond to and coincide with the flanges 24 of the journal-boxes or bearings 23, and are secured thereto by means of the bolts 27 which are tapped into said flanges 24 and 26.

The reference-character 28 indicates a cylinder-casting, the same being provided with oppositely extending hubs 29, preferably situated midway between the ends of said cylinder-casting 28, and forming an integral part thereof. Extending outwardly from each of said hubs 29, and integrally formed therewith, are journals or trunnions 30 and 31, said journals being mounted in the journal-boxes or bearings 23 formed upon the ends of the radial-arms 21 of the previously mentioned spiders. It will be clearly understood, that, although only three cylinder-castings 28 are represented in the drawings accompanying this specification, a fewer or greater number of such castings 28 may be used, as may be desired, without departing from the scope of the present invention. Furthermore, the form of the cylinder-castings may be compounded, so as to provide more than one cylinder-chamber, if it is so desired. Secured upon the free end of each journal 30 of the several cylinder-castings 28, by means of the keys 32, or any other suitable means, are gear-wheels 33, the teeth of which intermesh or operatively engage with the teeth of the stationary gear-wheel 12, hereinabove mentioned. Each of the said cylinder-castings 28 are provided with a chamber 34, extending longitudinally from end to end of the said cylinder-casting. Slidably arranged in said cylinder-chamber 34 is a piston 35, which is provided at each end with a plurality of friction-rings 36. Each end of said cylinder-chamber 34, is closed by means of a cylinder-head 37, the same being secured in place by means of tap-bolts or screws 38.

Upon the inner side of each cylinder-head 37 is a circular flange or rib 39, the peripheral surface of which coincides in diameter with the diameter of the cylinder-chamber 34, and is adapted to penetrate or fit therein, so as to provide a space 40, which allows for the formation of an air-cushion, to prevent any hard or unnecessary banging or hammering of the piston 35 against the cylinder-head 37, as it slides back and forth from end to end of the said cylinder-chamber 34. Each cylinder-head 37 is also provided with an air-intake or valve, comprising a valve-stem 41, slidably arranged in an opening 42 with which the cylinder-head 37 is provided. A valve-disk 43 is secured to said valve stem 41, and preferably forms an integral part thereof, said valve-disk 43 being adapted to register normally against the inner side of said cylinder-head 37, to close a plurality of holes or openings 44, which form suitable air-intakes or passages, as will be clearly understood.

A disk or washer 45 is secured upon the free end of the valve-stem 41, and is retained in its proper position by means of a pin 46, or any other suitable means, and a suitably formed compression spring 47 is arranged upon said valve-stem 41, between the said disk or washer 45 and the upper or outer surface of the cylinder-head 37 for the purpose of normally retaining the valve-disk 43 in its closing relation with the said holes or openings 44, substantially as illustrated. As will be readily understood, the piston 35, when passing in a direction away from the cylinder-head 37, causes a vacuum in the cylinder-chamber 34, and the pressure of the outside atmosphere, coupled with the suction of the moving piston 35, causes the valve-disk 43 to move away from its closing relation with the intake holes or openings 44, thereby allowing the air to rush into the cylinder-chamber 34, through said holes or openings 44, and fill the space behind the retreating piston 35.

Each cylinder-casting 28 is provided upon one side with a longitudinally extending rib or extension 48, terminating at each end of the cylinder-casting 28 in a rectangular-casting 49, the said rib or extension 48 and the rectangular casting 49, being preferably formed integrally with the cylinder-casting 28. Each rectangular-casting 49 is provided with an inwardly extending cylindrical socket 50, the several cylindrical sockets 50 being connected by an air-duct or passage 51, which extends longitudinally through the rib or extension 48. Each cylindrical socket 50 is also in communication with the cylinder-chamber 34 by means of a hole or opening 52, forming an air-duct or passage, as will be clearly evident.

Arranged in each cylindrical socket 50 is an air-outlet valve, through which the air which is compressed in the cylinder-chamber 34 is driven and forced into the air-duct or passage 51. This said air-outlet valve comprises a shell 53 providing a valve-chamber 54, the upper end of said shell 53 being provided with a hole or opening 55 forming an air-passage. The said shell 53 is provided at its bottom end with internal screw-threads 56, and a screw-threaded plug or closure 57 is connected therewith. This screw-threaded plug or closure 57 is provided with a centrally disposed and outwardly extending portion 58, and the said plug or closure 57, with this portion 58, is provided with a hole or opening 59, in which is slidably arranged a valve-stem 60, which extends into the valve-chamber 54, and terminates in a valve-disk 61, adapted to normally close the hole or opening 55 in the shell 53. A coiled or compression spring 62 is arranged upon said valve-stem 60, between the inner surface of the plug or closure 57 and the valve-disk 61, for the purpose of automatically retaining the valve-disk 61 in its normally closing position, as above described. The plug or closure 57 is furthermore provided with a plurality of holes or openings 63, which serve as air-passages leading from the valve-chamber 54 into the said air-duct or passage 51. The cylindrical socket 50 is provided at its outer end with internal screw-threads 64, a screw-threaded plug or closure 65 engaging with said screw-threads 64, for the purpose of closing the said cylindrical sockets 50, and also for the purpose of retaining the said air-outlet valve in place. The upper surface of this said plug or closure 65 is provided with spanner-wrench holes 66, and a groove 67 extends around its periphery, in such position, so that when the said plug or closure 65 is screwed down in its proper place, this said groove 67 is brought opposite the hole or opening 52, which leads from the cylinder-chamber 34. Extending inwardly from this groove 67 are holes or openings 68, which terminate near the center of the plug or closure 65, another hole or opening 69 being arranged in the bottom of the said plug or closure 65 which connects or joins with the above-mentioned holes or openings 68, this said hole or opening 69 being adapted to register above and coincide with the holes or openings 55 of the shell 53, all of these above described holes or openings 52, 68, 69, and 55 forming an air-passage, connecting the cylinder-chamber 34 with the valve-chamber 54.

The journal 31 of each cylinder-casting 28 is provided with an opening or passage 70, leading from the air-duct or passage 51 ordinarily to the free end of said journal 31. The said opening or passage 70 is provided, at the free end of said journal 31, with an internal screw-thread 71, a screw-threaded bushing 72 which is provided with a shoulder 73 being adapted to abut against the end of said journal 31, when screwed into said journal 31. Arranged so as to swivel in said bushing 72 is a nipple 74 which is provided upon its inner end with a shoulder 75, adapted to abut against the inner end of said bushing 72, and prevent the said nipple 74 from being drawn outwardly or away from its swiveling connection with said bushing 72. A friction ring 76 is arranged between the shoulder 75 of the nipple 74, and the inner end of the bushing 72. The free end of the nipple 74 is provided with a screw-thread 77, and an elbow-joint 78 is connected therewith. A coiled or compression spring 79 is arranged upon said nipple 74, between the flange of said elbow-joint 78 and the shoulder 73 of the bushing 72, for the purpose of retaining the nipple 74 and its shoulder 75 in their proper engagement with the inner end of the bushing 72, to provide an air-tight joint which is capable, however, of a swiveling action. Secured to the free end of the elbow-joint 78, by means of a union 80, or in any other suitable manner, is a pipe or hose-connection 81, the same being preferably of the metal-hose type, but it may be of any other suitable construction, and material.

The free end of the main shaft 13 is provided with an inwardly extending cylindrical opening or passage 82, a plurality of screw-threaded holes or openings 83 extending outwardly from the said opening or passage 82, to the outer surface of the said main-shaft 13, these holes or openings 83 corresponding, in number, to the number of cylinders employed in the air compressor or exhauster. Screwed in each of these screw-threaded holes or openings 83 are correspondingly screw-threaded nipples 84, upon the free ends of which are screwed the elbow-joints 85, each of said elbow-joints, in turn, being connected by means of a union 86 to one of the hose-connections 81 leading from the journals 31 of the cylinder-castings 28.

The outer end of the opening or passage 82 is provided, at the free end of said main-shaft 13, with an internal screw-thread 87, a screw-threaded bushing 88, provided with a shoulder 89, and adapted to abut against the end of said main-shaft 13, being screwed into said main-shaft 13. Arranged, so as to swivel in said bushing 88, is a nipple 90, provided upon its inner end with a shoulder 91, which is adapted to abut against the inner end of said bushing 88, and prevent the said nipple 90 from being drawn outwardly, or away, from its swiveling connection with said bushing 88. A friction ring 92 is arranged between the shoulder 91 of said nipple 90 and the inner end of said bushing 88. The free end of said nipple 90 is provided with a screw-thread 93, and a union 94 is connected therewith. A coiled or compression spring 95 is arranged upon said nipple 90, between the flange of said union 94 and the shoulder 89 of the bushing 88, for the purpose of retaining the nipple 90 and its shoulder 91 in its proper engagement with the inner end of the said bushing 88, to provide an air-tight joint, which is capable, however, of a swiveling action. An elbow joint 96 is connected to the said union 94, by means of a screw-threaded nipple 97, and this elbow joint 96 has connected therewith a pipe or hose-connection 98, designed to conduct the air driven therethrough to a storage tank or reservoir, or to conduct the air to such other point where any other disposals, as may be desired, may be made of it.

Having thus described the general construction and arrangement of the devices and parts of the novel air compressor embodying the principles of the present invention, it remains to describe this operation thereof, when utilized to compress or exhaust air.

The main-shaft 13 is caused to revolve or turn by means of the driving pulley 14 which is operatively connected with a prime-mover. The spiders, upon the free ends of which are mounted in bearings or journal-boxes, the cylinders, being rigidly secured upon the main-shaft 13, thus turn therewith. The gear-wheels 33 secured upon the journals 30 of the cylinder-castings 28, being in mesh with the stationary and centrally disposed gear-wheel 12, are caused to travel around said gear-wheel 12, by the movement of the main-shaft 13, and the spiders connected therewith. In traveling around said gear-wheel 12, the said gear-wheels 33 are caused to revolve, and in turn cause the cylinder-castings 28 to revolve on an axis, midway between its ends, all of cylinder-castings 28 at the same time being caused to travel in a circuit concentric with the main-shaft 13. The revolutions of the cylinder-castings 28 may be compared with the movement of the earth around the sun, in the manner of a sun and planet movement, which, while traveling in its orbit, still has an independent revolving movement upon its own axis. By means of the revolving movements of the cylinder-castings 28, about the main-shaft 13, as above described, the centrifugal force produced, causes each piston 35, slidably arranged in the cylinder-chambers 34, to slide back and forth in its respective cylinder-chamber. Owing to the peculiar independent revolution of the cylinder-castings 28, the movement of each piston 35 is always in an outward direction from the axis of the main-shaft 13, for as the piston 35 flies outwardly to the outer end of the cylinder-chamber 34 with relation to the main-shaft 13, that end, owing to this independent revolution of the cylinder-casting 28 upon its own axis, is turned until it becomes the inner part of said cylinder-chamber 34, with relation to the main-shaft 13, whereupon the piston 35 is caused to fly outwardly again to the opposite end of the cylinder-chamber 34, which, in turn, has changed its position from that of the inner end of the cylinder-chamber 34, to that of the outer end of the same, with relation to the main-shaft 13.

The piston 35 in its movements from end to end of the cylinder-chamber 34, allows the air to enter the said cylinder-chamber through the air-intake valve behind the piston, as it moves away from one end thereof, to the other end of the cylinder, as will be evident. At the same time, the said piston 35 compresses the air in front of it, and drives the same from the cylinder-chamber 34 through the air-outlet valve into the air-duct or passage 51, thence through the opening or passage 70 in the journal 31; thence through the pipes or hose-connections 81, and fittings, into the opening or passage 82 of the main-shaft 13, thence through the pipe or hose-connection 98, and its fittings; and, then to be disposed of as it may be desired, all of which will be clearly understood from an inspection of the accompanying drawings and the detailed description of the parts therein illustrated and as described in the foregoing specification.

It will thus be readily understood, that, an air-compressor or exhauster of novel construction, and operating upon a new principle, is provided by the present invention; this said air-compressor being very economical in operation, and possessing a very high efficiency in carrying out its work; and, furthermore, an air-compressor is the result which commends itself by reason of the simplicity of its construction.

I am aware that changes may be made in the various arrangements and combinations of the devices and parts, as well as in the details of the construction of the same without departing from the scope of this invention, as defined in the claims which are appended to this specification. Hence, I do not limit my present invention to the exact arrangements and combinations of the devices and parts as described in the foregoing specification, nor do I confine myself to the exact details of the construction of any of the said parts, as illustrated in the accompanying drawings.

I claim:—

1. An air-compressor comprising a main shaft, and a plurality of cylinders revolving with said shaft, and each cylinder having a revolving action on an axis extending laterally across the cylinder between the ends thereof, and independent of the revolving action about said shaft, substantially as and for the purposes set forth.

2. An air-compressor comprising a main shaft, and a plurality of cylinders revolving with said shaft, and each cylinder having a revolving action on an axis extending laterally across the cylinder between the ends thereof, and independent of the revolving action about said shaft, and a reciprocatory piston in each cylinder, substantially as and for the purposes set forth.

3. An air-compressor comprising a main shaft, and a plurality of cylinders revolving with said shaft, and each cylinder having a revolving action on an axis extending laterally across the cylinder between the ends thereof, and independent of the revolving action about said shaft, and a reciprocatory piston in each cylinder, and means connected with each cylinder for conveying the compressed air from said cylinders, substantially as and for the purposes set forth.

4. An air-compressor comprising a main shaft, and a plurality of cylinders revolving with said shaft, and each cylinder having a revolving action on an axis extending laterally across the cylinder between the ends thereof, and independent of the revolving action about said shaft, said main shaft being provided with a tubular air-receiving portion, and means connected with each cylinder for conveying the compressed air from each cylinder into the air-receiving portion of the main shaft, substantially as and for the purposes set forth.

5. An air-compressor comprising a main shaft, and a plurality of cylinders revolving with said shaft, and each cylinder having a revolving action on an axis extending laterally across the cylinder between the ends thereof, and independent of the revolving action about said shaft, and a reciprocatory piston in each cylinder, said main shaft being provided with a tubular air-receiving portion, and means connected with each cylinder for conveying the compressed air from each cylinder into the air-receiving portion of the main shaft, substantially as and for the purposes set forth.

6. An air-compressor comprising a main shaft, frames mounted upon and revolving with said shaft, said frames being provided with journal-bearings, a plurality of cylinders provided with journals mounted in said bearings, each cylinder having a revolving action on an axis extending laterally across the cylinder between the ends thereof, and independent of the revolving actions of said shaft and frames, and means for conveying the compressed air from a journal of each cylinder, substantially as and for the purposes set forth.

7. An air-compressor comprising a main shaft, frames mounted upon and revolving with said shaft, said frames being provided with journal-bearings, a plurality of cylinders provided with journals mounted in said bearings, each cylinder having a revolving action on an axis extending laterally across the cylinder between the ends thereof, and independent of the revolving actions of said shaft and frames, a reciprocatory piston in each cylinder, and means for conveying the compressed air from a journal of each cylinder, substantially as and for the purposes set forth.

8. An air-compressor comprising a main shaft, frames mounted upon and revolving with said shaft, said frames being provided with journal-bearings, a plurality of cylinders provided with journals mounted in said bearings, each cylinder having a revolving action on an axis extending laterally across the cylinder between the ends thereof, and independent of the revolving actions of said shaft and frames, said main shaft being provided with a tubular air-receiving portion, and means for conveying the compressed air from a journal of each cylinder into the air-receiving portion of the main shaft, substantially as and for the purposes set forth.

9. An air-compressor comprising a main shaft, frames mounted upon and revolving with said shaft, said frames being provided with journal-bearings, a plurality of cylinders provided with journals mounted in said bearings, each cylinder having a revolving action on an axis extending laterally across the cylinder between the ends thereof, and independent of the revolving actions of said shaft and frames, a reciprocatory piston in each cylinder, said main shaft being provided with a tubular air-receiving portion, and means for conveying the compressed air from a journal of each cylinder into the air-receiving portion of the main shaft, substantially as and for the purposes set forth.

10. In an air-compressor, the combination with a main-shaft, of a plurality of cylinder-castings mounted upon said main-shaft so as to revolve therewith, means for causing an independent revolution of said cylinder-castings upon an axis extending laterally across and between the ends of said cylinder-castings, and means for conducting the air compressed in said cylinder-castings to a common outlet from the air-compressor, substantially as and for the purposes set forth.

11. In an air-compressor, the combination with a main-shaft, of a pair of spiders, provided with a plurality of radial arms secured upon said main-shaft, journal-boxes upon the free ends of said radial-arms, a plurality of cylinder-castings mounted in said journal-boxes, means for causing an independent revolution of said cylinder-castings upon an axis extending laterally across and between the ends of said cylinder-castings, and means for conducting the air compressed in said cylinder-castings to a common outlet from the air-compressor, substantially as and for the purposes set forth.

12. In an air-compressor, the combination with a base or foundation-member, of a pair of standards secured thereto, bearings or journal-boxes connected with said standards, a main-shaft mounted in said bearings or journal-boxes, a plurality of cylinder-castings mounted upon said main-shaft so as to revolve therewith, means for causing an independent revolution of said cylinder-castings upon an axis extending laterally across and between the ends of said cylinder-castings, and means for conducting the air compressed in said cylinder castings to a common outlet from the air-compressor, substantially as and for the purposes set forth.

13. In an air-compressor, the combination with a base or foundation-member, of a pair of standards secured thereto, bearings or journal-boxes connected with said standards, a main-shaft mounted in said bearings or journal-boxes, a pair of spiders, provided with a plurality of radial arms secured upon said main-shaft, journal-boxes upon the free ends of said radial-arms, a plurality of cylinder-castings mounted in said journal-boxes, means for causing an independent revolution of said cylinder-castings upon an axis extending laterally across and between the ends of said cylinder-castings, and means for conducting the air compressed in said cylinder-castings to a common outlet from the air-compressor, substantially as and for the purposes set forth.

14. In an air-compressor, the combination with a base member, of a pair of standards secured thereto, journal-boxes on said standards, a stationary gear-wheel having a hollow-hub clamped in one of said journal-boxes, a main-shaft mounted or journaled in the hollow-hub of said stationary gear-wheel and the remaining journal-box, means for driving main-shaft, a plurality of cylinder-castings mounted upon said main-shaft so as to revolve therewith, means for causing an independent revolution of said cylinder-castings upon an axis extending laterally across and between the ends of said cylinder-castings, and means for conducting the air compressed in said cylinder-castings to a common outlet from the air-compressor, substantially as and for the purposes set forth.

15. In an air-compressor, the combination with a base member, of a pair of standards secured thereto, journal-boxes on said standards, a stationary gear-wheel having a hollow-hub clamp in one of said journal-boxes, a main-shaft mounted or journaled in the hollow-hub of said stationary gear-wheel and the remaining journal-box, means for driving said main shaft, a pair of spiders, provided with a plurality of radial-arms secured upon said main-shaft, journal-boxes on the free-ends of said radial-arms, a plurality of cylinder-castings journals extending laterally from and located between the ends of said cylinder-castings, said journals being adapted to be journaled in said journal boxes of said radial arms, gear-wheels secured to one of the journals of each cylinder-casting, said gear-wheels being adapted to mesh with said stationary gear-wheel and revolve around the same to cause an independent revolution of said cylinder castings on the axis of their journals, and means for conducting the air compressed in said cylinder-castings to a common outlet from the air-compressor, substantially as and for the purposes set forth.

16. In an air-compressor, the combination with a base-member, of a pair of standards secured thereto, journal-boxes on said standards, a stationary gear-wheel having a hollow-hub clamped in one of said journal-boxes, a main shaft mounted or journaled in the hollow-hub of said stationary gear-wheel and the remaining journal-box, means for driving main shaft, a pair of spiders, provided with a plurality of radial-arms secured upon said main-shaft, journal-boxes on the free-ends of said radial-arms, a plurality of cylinder-castings journals extending laterally from and located between the ends of said cylinder-castings, said journals being adapted to be journaled in said journal boxes of said radial arms, gear-wheels secured to one of the journals of each cylinder-casting, said gear-wheels being adapted to mesh with said stationary gear-wheel and revolve around the same to cause an independent revolution of said cylinder castings on the axis of their journals, each cylinder-casting being provided with a chamber, a piston slidably arranged in each cylinder-chamber, and means connected with each cylinder-chamber for conducting the air compressed therein to a common outlet from the air compressor, substantially as and for the purposes set forth.

17. In an air-compressor, the combination with a base-member, of a pair of standards secured thereto, journal-boxes on said standards, a stationary gear-wheel having a hollow-hub clamped in one of said journal-boxes, a main-shaft mounted or journaled in the hollow-hub of said stationary gear-wheel and the remaining journal-box, means for driving said main shaft, a pair of spiders, provided with a plurality of radial-arms secured upon said main-shaft, journal-boxes on the free-ends of said radial-arms, a plurality of cylinder-castings journals extending laterally from and located between the ends of said cylinder-castings, said journals being adapted to be journaled in said journal-boxes of said radial arms, gear-wheels secured to one of the journals of each cylinder-casting, said gear-wheels being adapted to mesh with said stationary gear-wheel and revolve around the same to cause an independent revolution of said cylinder-castings on the axis of their journals, each cylinder-casting being provided with a chamber, cylinder-heads adapted to close each end of said cylinder-chambers, a circular rib or flange on the inner side of each cylinder-head adapted to fit into the ends of said cylinder-chamber and constructed so as to provide a space to form an air-cushion at each end of said cylinder chamber, air-intake valves in each cylinder head, a piston slidably arranged in each cylinder-chamber, and means connected with each cylinder-chamber for conducting the air compressed therein to a common outlet from the air-compressor, substantially as and for the purposes set forth.

18. In an air-compressor, the combination with a base-member, of a pair of standards secured thereto, journal-boxes on said standards, a stationary gear-wheel having a hollow-hub clamped in one of said journal-boxes, a main-shaft mounted or journaled in the hollow-hub of said stationary gear-wheel and the remaining journal-box, means for driving main shaft, a pair of spiders, provided with a plurality of radial-arms secured upon said main-shaft, journal-boxes on the free-ends of said radial-arms, a plurality of cylinder-castings journals extending laterally from and located between the ends of said cylinder-castings, said journals being adapted to be journaled in said journal boxes of said radial arms, gear-wheels secured to one of the journals of each cylinder-casting, said gear-wheels being adapted to mesh with said stationary gear-wheel and revolve around the same to cause an independent revolution of said cylinder-castings on the axis of their journals, each cylinder-casting being provided with a chamber, cylinder-heads adapted to close each end of said cylinder-chambers, a circular rib or flange on the inner side of each cylinder-head adapted to fit into the end of said cylinder-chamber and constructed so as to provide a space to form an air-cushion at each end of said cylinder-chamber, air intake-valves in each cylinder head, a piston slidably arranged in each cylinder chamber, an air-outlet-valve at each end of said cylinder-chamber, and means for conducting the air compressed in said cylinder chambers to a common outlet from the air compressor, substantially as and for the purposes set forth.

19. In an air-compressor, the combination with a main-shaft, of a plurality of cylinder-castings mounted upon said main shaft so as to revolve therewith, means for causing an independent revolution of said cylinder-castings upon an axis extending laterally across and between the ends of said cylinder-castings, each cylinder-casting being provided with a chamber, a piston slidably arranged in each cylinder-chamber, and means connected with each cylinder-chamber for conducting the air compressed therein to a common outlet from the air-compressor, substantially as and for the purposes set forth.

20. In an air-compressor, the combination with a main-shaft, of a plurality of cylinder-castings mounted upon said main-shaft so as to revolve therewith, means for causing an independent revolution of said cylinder-castings upon an axis extending laterally across and between the ends of said cylinder-castings, each cylinder-casting being provided with a chamber, cylinder-heads adapted to close each end of said cylinder-chambers, a circular rib or flange on the inner side of each cylinder-head, adapted to fit into the ends of said cylinder-chamber and constructed so as to provide a space to form an air-cushion at each end of said cylinder chambers, air-intake valves in each cylinder-head, and a piston slidably arranged in each cylinder-chamber, and means connected with each cylinder-chamber for conducting the air compressed therein to a common outlet from the air-compressor, substantially as and for the purposes set forth.

21. In an air-compressor, the combination with a main-shaft, of a plurality of cylinder-castings mounted upon said main-shaft so as to revolve therewith, means for causing an independent revolution of said cylinder-castings upon an axis extending laterally across and between the ends of said cylinder-castings, each cylinder-casting being provided with a chamber, cylinder-heads adapted to close each end of said cylinder-chambers, a circular rib or flange on the inner side of each cylinder-head, adapted to fit into the ends of said cylinder-chamber and constructed so as to provide a space to form an air-cushion at each end of said cylinder chambers, air-intake valves in each cylinder-head and a piston slidably arranged in each cylinder-chamber, an air-outlet valve at each end of said cylinder-chamber, and means for conducting the air compressed in said cylinder-chambers to a common outlet from the air-compressor, substantially as and for the purposes set forth.

22. In an air-compressor, the combination with a main-shaft, of a pair of spiders provided with a plurality of radial-arms, secured upon said main shaft, journal-boxes upon the free ends of said radial arms, a plurality of cylinder-castings mounted in said journal-boxes, means for causing an independent revolution of said cylinder-castings upon an axis extending laterally across and between the ends of said cylinder-castings, each cylinder-casting being provided with a chamber, a piston slidably arranged in each cylinder-chamber, and means connected with each cylinder-chamber for conducting the air compressed therein to a common outlet from the air-compressor, substantially as and for the purposes set forth.

23. In an air-compressor, the combination with a main-shaft, of a pair of spiders, provided with a plurality of radial-arms, secured upon said main-shaft, journal-boxes upon the free-ends of said radial-arms, a plurality of cylinder-castings mounted in said journal-boxes, means for causing an independent revolution of said cylinder-castings upon an axis extending laterally across and between the ends of said cylinder-castings, each cylinder casting being provided with a chamber, cylinder-heads adapted to close each end of said cylinder-chambers, a circular rib or flange on the inner side of each cylinder-head, adapted to fit into the ends of the said cylinder-chambers, and constructed so as to provide a space to form an air-cushion at each end of said cylinder-chambers, air-intake valves in each cylinder-chamber, a piston slidably arranged in each cylinder-chamber, and means connected with each cylinder-chamber for conducting the air compressed therein to a common outlet from the air-compressor, substantially as and for the purposes set forth.

24. In an air-compressor, the combination with a main-shaft, of a pair of spiders provided with a plurality of radial-arms, secured upon said main-shaft, journal-boxes upon the free-ends of said radial-arms, a plurality of cylinder-castings mounted in said journal-boxes, means for causing an independent revolution of said cylinder-castings upon an axis extending laterally across and between the ends of said cylinder-castings, each cylinder-casting being provided with a chamber, cylinder-heads adapted to close each end of said cylinder-chambers, a circular rib or flange on the inner side of each cylinder-head, adapted to fit into the ends of the said cylinder-chambers, and constructed so as to provide a space to form an air-cushion at each end of said cylinder-chambers, air-intake valves in each cylinder-chamber, a piston slidably arranged in each cylinder-chamber, an air-outlet valve at each end of said cylinder-chamber, and means for conducting the air compressed in said cylinder-chambers to a common outlet from the compressor, substantially as and for the purposes set forth.

25. In an air-compressor, the combination with a base-member, of a pair of standards secured thereto, journal-boxes on said standards, a stationary gear-wheel provided with a hollow hub clamped in one of said journal-boxes, a main-shaft provided at one end with a hollow-passage or opening, said shaft being journaled in the hollow-hub of said stationary gear-wheel and the remaining journal-box, fast and loose pulleys mounted on said main shaft to drive the same, a pair of spiders, provided with a plurality of radial-arms secured upon said main-shaft, journal-boxes on the free ends of said radial-arms, a plurality of cylinder castings provided with cylinder-chambers and an air-outlet passage, journals extending laterally from said cylinder-castings and located between the ends of said cylinder-castings, one of said journals being provided with a hollow-passage or opening at its free end, said journals being adapted to be journaled in said journal boxes of said radial-arms, gear-wheels keyed to one of the journals of each cylinder-casting, said gear-wheels being adapted to mesh with the stationary gear-wheel and revolve around the same to cause an independent revolution of each cylinder-casting on the axis of their journals, cylinder-heads provided with a plurality of air-passages, adapted to close each end of said cylinder-chambers, a circular rib or flange on the inner side of each cylinder-head, adapted to fit into the ends of said cylinder chambers and constructed so as to provide a space to form an air-cushion at each end of said cylinder chambers, air-intake valves in each cylinder-head comprising valve-stems slidably arranged in said cylinder-heads, valve disks upon the inner ends of said valve-stems adapted to normally close the air-passages in said cylinder heads, disks or washers secured upon the outer ends of said valve-stems, and a compression spring arranged upon said valve stems between the cylinder-heads and said disks or washers, pistons slidably arranged in said cylinder-chambers, an air-outlet valve at each end of each cylinder-casting adapted to connect with the air outlet passage therein, means for connecting each air-outlet valve with the hollow passage or opening in the journal of each cylinder-casting, means for connecting the hollow passage or opening in the journal of each cylinder-casting with the hollow passage or opening of the main-shaft, and means connected with the hollow passage or opening of main-shaft to form an air-outlet from the air-compressor, substantially as and for the purposes set forth.

26. In an air-compressor, the combination with a base-member, of a pair of standards secured thereto, journal-boxes on said standards, a stationary gear-wheel provided with a hollow hub clamped in one of said journal-boxes, a main-shaft provided at one end with a hollow-passage or opening, said shaft being journaled in the hollow-hub of said stationary gear-wheel and the remaining journal-box, fast and loose pulleys mounted on said main shaft to drive the same, a pair of spiders, provided with a plurality of radial-arms, secured upon said main-shaft, journal-boxes on the free ends of said radial-arms, a plurality of cylinder-castings provided with cylinder-chambers and an air-outlet passage, journals extending laterally from said cylinder-castings and located between the ends of said cylinder-castings, one of said journals being provided with a hollow-passage or opening at its free end, said journals being adapted to be journaled in said journal boxes of said radial-arms, gear-wheels keyed to one of the journals of each cylinder-casting, said gear-wheels being adapted to mesh with the stationary gear-wheel and revolve around the same to cause an independent revolution of each cylinder-casting on the axis of its journals, cylinder-heads provided with a plurality of air-passages, adapted to close each end of said cylinder-chambers, a circular rib or flange on the inner side of each cylinder-head, adapted to fit into the ends of said cylinder chambers and constructed so as to provide a space to form an air-cushion at each end of said cylinder-chambers, air-intake valves in each cylinder-head, comprising valve-stems slidably arranged in said cylinder-heads, valve-disks upon the inner ends of said valve-stems adapted to normally close the air-passages in said cylinder heads, disks or washers secured upon the outer ends of said valve-stems, and a compression spring arranged upon said valve stems between the cylinder-heads and said disks or washers, pistons slidably arranged in said cylinder-chambers, a rectangular-casting provided with a socket at each end of said cylinder-castings, an air-outlet valve in each of said sockets adapted to connect with the air-outlet passages of said cylinder-castings, a rib or extension provided with an air-passage or duct upon each cylinder-casting, said air-passages or ducts being adapted to connect with said hollow-passage or opening in the journal of each cylinder-casting, a hose-connection secured in the free end of said hollow-passage or opening in the journal of each cylinder-casting so as to swivel therein, the free ends of said hose-connections being connected with the hollow-passage or opening in the main-shaft, and a pipe or hose-connection received in the free end of said hollow-passage or opening in the main-shaft, so as to swivel therein, substantially as and for the purposes set forth.

27. In an air-compressor, the combination with a pair of standards and a main-shaft, of a stationary gear-wheel, a pair of spiders provided with radial-arms secured upon said main-shaft, a plurality of cylinder-castings provided with cylinder-chambers, journals extending laterally from said cylinder-casting and between the ends thereof, said journals being mounted in the free-ends of said radial-arms of said spiders, gear-wheels secured upon certain of said journals of said cylinder-castings and adapted to mesh with said stationary gear-wheel, pistons slidably arranged in said cylinder-chambers of said cylinder-castings, air-intake and air-outlet valves connected at each end of said cylinder-chambers of said cylinder castings, and means for conducting the air compressed in said cylinder-chambers to a common outlet from the air-compressor, substantially as and for the purposes set forth.

28. In an air-compressor, the combination with a pair of standards and a main-shaft, of a stationary gear-wheel, a pair of spiders provided with radial-arms secured upon said main-shaft, a plurality of cylinder-castings provided with cylinder-chambers, journals extending laterally from said cylinder-casting and between the ends thereof, said journals being mounted in the free-ends of said radial-arms of said spiders, gear-wheels secured upon certain of said journals of said cylinder-castings and adapted to mesh with said stationary gear-wheel, pistons slidably arranged in said cylinder-chambers of said cylinder-castings, air-intake and air-outlet valves connected at each end of said cylinder-chambers of said cylinder castings, a rib or extension on said cylinder-castings, provided with an air-duct or passage connecting with said air-outlet valves, certain of said journals of said cylinder-castings being provided with a hollow-passage or opening extending inwardly from their free ends and connecting with said air-ducts or passages, a bushing secured in the free ends of said journals provided with said hollow passage or openings, a nipple, arranged so as to swivel in each bushing and provided with a shoulder adapted to abut against the inner end of said bushing, an elbow-joint connected with the free end of each nipple, a compression spring arranged upon said nipple between said bushing and said elbow-joint, a union connected with said elbow-joint, and a hose-connection secured to said union, unions on the free ends of said hose-connections, elbow-joints connected with said unions, the free end of said main-shaft being provided with a hollow-passage or opening and said elbow-joints being connected therewith, and means for conducting the air from said hollow-passage or opening in said main-shaft to a common outlet from the compressor, substantially as and for the purposes set forth.

29. An air-compressor comprising a main-shaft, a stationary gear-wheel, said gear-wheel being formed with a tubular hub-member through which said shaft extends and revolves therein, a plurality of cylinders, and a gear-wheel connected with each cylinder and meshing with the gear-wheel on said main shaft, all arranged so that said cylinders will revolve with the shaft but each cylinder having a revolving action independent of said shaft, substantially as and for the purposes set forth.

30. An air-compressor comprising a main-shaft, a stationary gear-wheel, said gear-wheel being formed with a tubular hub-member through which said shaft extends and revolves therein, a plurality of cylinders, and a gear-wheel connected with each cylinder and meshing with the gear-wheel on said main shaft, all arranged so that said cylinders will revolve with the shaft but each cylinder having a revolving action independent of said shaft, and a reciprocatory piston in each cylinder, substantially as and for the purposes set forth.

31. An air-compressor comprising a main-shaft, a stationary gear-wheel, said gear-wheel being formed with a tubular hub-member through which said shaft extends and revolves therein, a plurality of cylinders, and a gear-wheel connected with each cylinder and meshing with the gear-wheel on said main shaft, all arranged so that said cylinders will revolve with the shaft but each cylinder having a revolving action independent of said shaft, and means connected with each cylinder for conveying the compressed air from said cylinders, substantially as and for the purposes set forth.

32. An air-compressor comprising a main-shaft, a stationary gear-wheel, said gear-wheel being formed with a tubular hub-member through which said shaft extends and revolves therein, a plurality of cylinders, and a gear-wheel connected with each cylinder and meshing with the gear-wheel on said main shaft, all arranged so that said cylinders will revolve with the shaft but each cylinder having a revolving action independent of said shaft, and a reciprocatory piston in each cylinder, and means connected with each cylinder for conveying the compressed air from said cylinders, substantially as and for the purposes set forth.

33. An air-compressor comprising a main shaft, a stationary gear-wheel, said gear-wheel being formed with a tubular hub-member through which said shaft extends and revolves therein, frames mounted upon and revolving with said shaft, said frames being provided with journal-bearings, a plurality of cylinders provided with journals mounted in said bearings, one of the journals of each cylinder being hollow, a gear-wheel mounted upon the other journal of each cylinder, said gear-wheels meshing with the gear-wheel on the main shaft, all arranged so that said cylinders will revolve with the shaft but each cylinder having a revolving action independent of said shaft, and means for conveying the compressed air from each hollow journal of each cylinder, substantially as and for the purposes set forth.

34. An air-compressor comprising a main shaft, a stationary gear-wheel, said gear-wheel being formed with a tubular hub-member through which said shaft extends and revolves therein, frames mounted upon and revolving with said shaft, said frames being provided with journal-bearings, a plurality of cylinders provided with journals mounted in said bearings, one of the journals of each cylinder being hollow, a gear-wheel mounted upon the other journal of each cylinder, said gear-wheels meshing with the gear-wheel on the main shaft, all arranged so that said cylinders will revolve with the shaft but each cylinder having a revolving action independent of said shaft, a reciprocatory piston in each cylinder, and means for conveying the compressed air from a journal of each cylinder, substantially as and for the purposes set forth.

35. An air-compressor comprising a main shaft, a stationary gear-wheel, said gear-wheel being formed with a tubular hub-member through which said shaft extends and revolves therein, frames mounted upon and revolving with said shaft, said frames being provided with journal-bearings, a plurality of cylinders provided with journals mounted in said bearings, one of the journals of each cylinder being hollow, a gear-wheel mounted upon the other journal of each cylinder, said gear-wheels meshing with the gear-wheel on the main shaft, all arranged so that said cylinders will revolve with the shaft but each cylinder having a revolving action independent of said shaft, said main shaft being provided with a tubular air-receiving portion, and means for conveying the compressed air from a journal of each cylinder into the air-receiving portion of the main shaft, substantially as and for the purposes set forth.

36. An air-compressor comprising a main shaft, a stationary gear-wheel, said gear-wheel being formed with a tubular hub-member through which said shaft extends and revolves therein, frames mounted upon and revolving with said shaft, said frames being provided with journal-bearings, a plurality of cylinders provided with journals mounted in said bearings, one of the journals of each cylinder being hollow, a gear-wheel mounted upon the other journal of each cylinder, said gear-wheels meshing with the gear-wheel on the main shaft, all arranged so that said cylinders will revolve with the shaft but each cylinder having a revolving action independent of said shaft, a reciprocatory piston in each cylinder, and means for conveying the compressed air from a journal of each cylinder, said main shaft being provided with a tubular air-receiving portion, and means for conveying the compressed air from a journal of each cylinder into the air-receiving portion of the main shaft, substantially as and for the purposes set forth.

In testimony, that I claim the invention set forth above I have hereunto set my hand this 7th day of December, 1907.

HENRY J. HORSTMANN.

Witnesses:
FREDK. C. FRAENTZEL,
FRED W. HORSTMAN.